United States Patent [19]

Horton

[11] Patent Number: 5,538,296

[45] Date of Patent: Jul. 23, 1996

[54] SWIVEL JOINT

[76] Inventor: Duane Horton, 598 W. 81st St., Tulsa, Okla. 74132

[21] Appl. No.: 441,931

[22] Filed: May 16, 1995

[51] Int. Cl.⁶ ..................................... F16L 27/08
[52] U.S. Cl. .................. 285/276; 285/286; 285/351
[58] Field of Search .................... 285/276, 286, 285/351

[56] References Cited

U.S. PATENT DOCUMENTS

| | | | |
|---|---|---|---|
| 2,112,108 | 3/1938 | Mackenzie | 285/276 X |
| 2,927,805 | 3/1960 | Faccou . | |
| 3,002,769 | 10/1961 | Deubler et al. | 285/276 X |
| 3,148,922 | 9/1964 | Roessler . | |
| 3,347,570 | 10/1967 | Roessler . | |
| 4,185,841 | 1/1980 | Brundage | 285/276 X |
| 4,693,500 | 9/1987 | Anderson . | |

FOREIGN PATENT DOCUMENTS 2001231  7/1971  Germany ............................... 285/276

Primary Examiner—Dave W. Arola
Attorney, Agent, or Firm—Head Johnson & Kachigian

[57] ABSTRACT

An improved swivel joint capable of high pressure service for rotatably connecting two conduits. The swivel joint includes an inner conduit and an outer conduit which are secured together by means of ball bearings. In addition to the ball bearings, there exist wear pads to assist the ball bearings in carrying the load should the ball bearings or bearing races become worn. Additionally, the bearing races and wear pad contacting surfaces are hardened to provide the swivel joint with extended life. The unique design of the swivel joint allows it to be safely used in high pressure service.

12 Claims, 4 Drawing Sheets

SWIVEL JOINT

BACKGROUND OF THE INVENTION

1. Field of the Invention

The present invention relates to a device that allows sections of rigid pipe to be rotatably joined together in such a manner that a swivel connection is formed, and, more particularly, to an improved swivel joint which is suitable for high pressure service and which has a longer service life than do existing devices.

2. Background

Pipe is used in many types of industry, including the oil industry and ship and rail loading industries. The majority of pipe used is rigid pipe. If flexibility is desired, the traditional method is to employ flexible hose. However, flexible hose is expensive and may break due to wear. An alternative to flexible hose is the use of swivel joints. Swivel joints allow two sections of rigid pipe to be joined together in a rotatable fashion. In other words, the sections of joined pipe may turn or twist. Thus, when coupled to elbows and the like, rigid pipe may be manipulated through the use of swivel joints in such a way as to provide a complex passageway.

Swivel joints are not new in the art, but they have traditionally been plagued with problems of leakage, breakdown, and a difficulty in swiveling. Most swivel joints include inner and outer, or male and female, conduits connected with ball race and bearing assemblies to allow for rotation of the conduits while preventing axial movement. An end seal, generally in the form of an O-ring, is provided to close off the space between the outer end of the female conduit and the base of the male conduit. An inner seal is usually provided at the inner junction of the male and female conduits in an attempt to provide added leak protection.

Efforts have been made to increase the leak resistance of prior art swivel joints by providing improved seals to facilitate fluid tight integrity of a swivel joint, such as are disclosed in U.S. Pat. Nos. 2,927,805; 3,347,570; and 4,693,500. But, despite the improvements made in the seals of the prior art devices, problems of leakage, breakdown, and difficulty in swiveling remain. It must be first recognized that the seals of the prior art devices are solely for the purpose of fluid control and containment. When the seals wear, a spill occurs. Furthermore, when the ball races wear more stress is imparted to the seals causing fatigue and failure. Such is also the case when alignment problems are encountered with the bearing races. Misalignment leads to abnormal wear. This wear on the bearing races can cause catastrophic failure of the joint, including axial displacement. Undo wear of seals also contraindicates the use of the prior art swivel joints in submerged service, where environmental concerns are preeminent. Many of the known devices are also difficult to adapt to standard pipe fixtures.

The above described problems with the prior art devices discourage their use, especially in situations where high pressures will be encountered. Still further, repeated seal fatigue lowers the useable life span of the prior art devices and increases repair costs and down time.

SUMMARY OF THE INVENTION

It is therefore an object of the present invention to provide an improved swivel joint which is capable of moving fluids under high pressure and which has an extended life span when compared to existing devices.

Another object of the invention is to provide an improved swivel joint capable of being manipulated in 360° rotation that remains functional even after its bearing races experience wear.

A further object of the invention is to provide an improved swivel joint incorporating wear pads, or bushings, so that if wear is incurred in the bearing races, the wear pads will carry the load, with the bearings then becoming a safety mechanism preventing a catastrophic failure of the joint.

A still further object of the invention is to provide an improved swivel joint having precision alignment of bearing races, the bearing races also being hardened and polished in the manufacturing process.

Another object of the invention is to provide an improved swivel joint having a flange constructed in such a manner as to "lock-up" the joint if significant and dangerous wear has occurred to keep the joint from coming apart.

An additional object of the present invention is to provide an improved swivel joint having seals positioned such that they will not be affected by movement of the swivel, thus decreasing the wear imparted to the seal.

Another object of the invention is to provide an improved swivel joint having an atmospheric seal for promoting joint integrity in submerged service and having a neck-down feature that allows for the connection of the swivel joint to common piping without the necessity of adaptive couplings.

These and other objects are achieved by applicant's improved swivel joint. Applicant provides an improved swivel joint which allows two fluid carrying conduits to be rotatably connected to one another. This swivel joint is designed to allow for high pressure service and to provide an extended service life when compared to prior art swivel joints. The swivel joint is comprised of an outer female conduit and an inner male conduit. The conduits are designed with complementary hardened bearing races to receive ball bearings. The ball bearings enable the swivel to rotate while the swivel is under pressure and also prevent the swivel from axially separating. The bearing races are precision cut and hold close tolerances. This ensures very little deflection in the swivel. Additionally, the races are unique because they are heat-treated and hardened. The hardened and polished races allow the swivel to operate for an extended service life as compared to swivel joints without hardened and polished races.

Interposed between the inner and outer conduits are one or more wear pads made from a phenolic material. If wear does occur in the bearing races, the wear pads then carry the load while the ball bearings act as a safety mechanism, preventing the swivel joint from separating. The use of the wear pads also extends the life of the swivel joint. To facilitate an even longer service life, the surfaces which contact the wear pads on both the inner and outer conduits are hardened.

O-rings or quad-rings are disposed between the inner and outer conduits and provide the primary seal of the swivel. The primary seal protects the bearing chamber from the contents which flow through the swivel. The primary seals have been positioned so that they are not affected by the movement of the swivel. Atmospheric seals are also provided which help contain the product and seal the bearing chamber from the environment, especially in submerged service.

On both ends of the assembled swivel joint, the conduits are necked-down, or tapered. This enables the swivel to be put into service without using adapters or special collars. An external flange is provided on the internal conduit to mate with the receiving end of the outer conduit. This flange serves two purposes. The first purpose is to provide a mating surface for an atmospheric end seal. The second purpose is to enable the swivel to lock-up in the event the ball bearings and races wear a significant amount. This helps prevent the swivel from wearing to such a degree that it fails and separates. A better understanding of the present invention will be obtained from the ensuing description taken in conjunction with the accompanying drawings and claims.

DETAILED DESCRIPTION OF THE PREFERRED EMBODIMENTS

Figure 2:
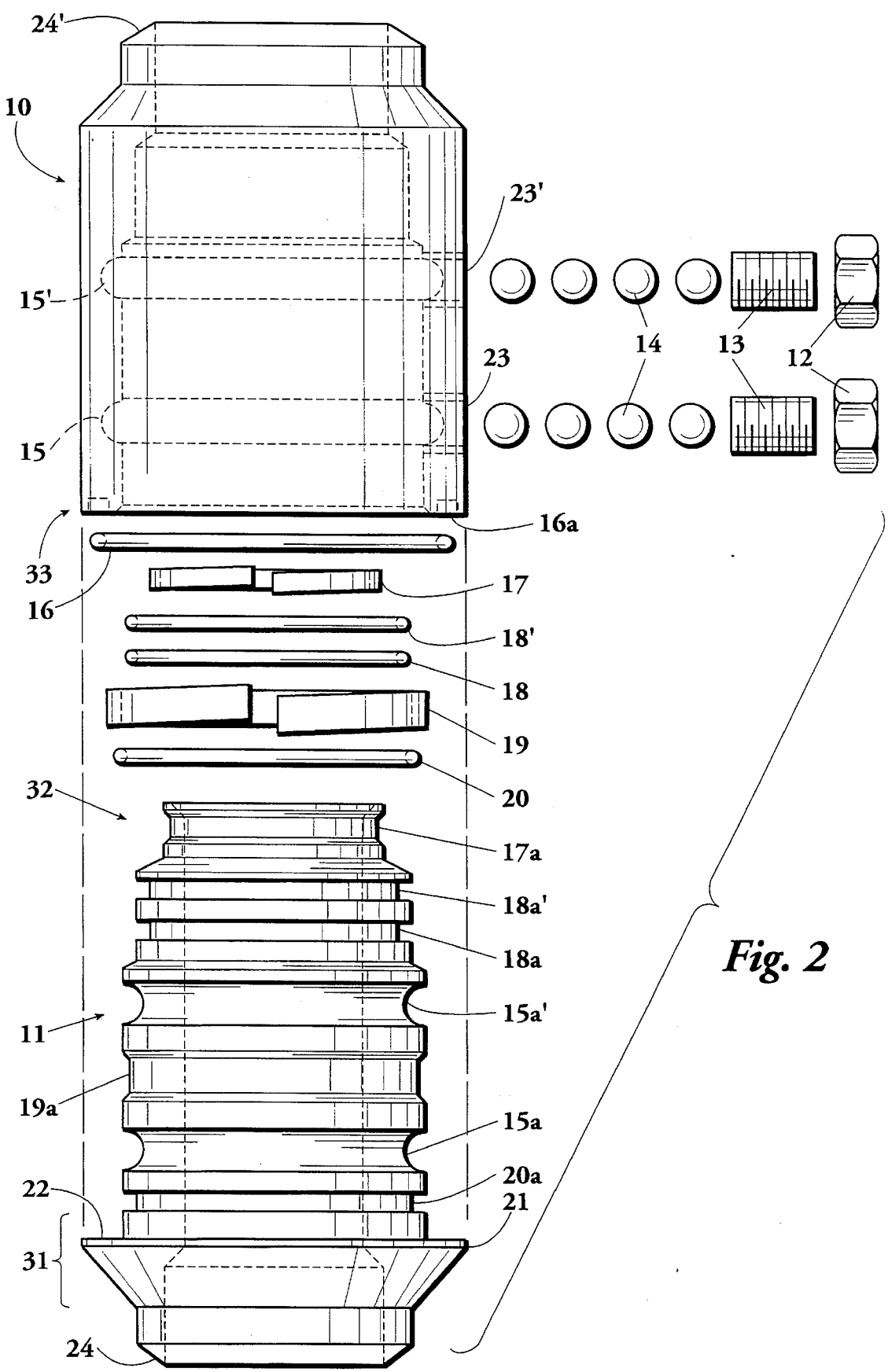
FIG. 2 shows an exploded view of the swivel joint.

Referring initially to FIG. 2 there is shown an exploded view of the invention. The invention includes two main pieces or segments. A tubular, outer female conduit is generally indicated by the reference numeral 10, while a tubular, inner male conduit is generally indicated by the reference numeral 11.

Inner conduit 11 can be said to have a base region 31 and a forward nose end 32. The outside surface of inner conduit 11 is slightly tapered from base end 31 to nose 32. The most prominent feature of base region 31 is flange 21. From flange 21 and proceeding toward nose region 32 along the outer surface of inner conduit 11 are a plurality of recessed areas, hardened and polished, for receiving a variety of seals and wear pads.

Closest to flange 21 is recessed area 20a. Recessed area 20a is adapted to receive an internal atmospheric seal 20. Further towards nose region 32 on the outside surface of inner conduit 11 are inner bearing races 15a, 15a'. These bearing races are separated by an area including recessed area 19a. Area 19a is adapted to receive a large wear pad 19. Forward of inner bearing race 15a' are two primary seal O-ring recessed areas 18a, 18a' for receiving the primary seal O-rings 18, 18'. Forward of these areas is the small wear pad recessed area 17a for receiving a small wear pad 17.

Turning now to the outer conduit 10, it can be said to have a receiving end 33 for accepting male conduit 11. An atmospheric end seal recessed area 16a is provided at the receiving end 33 of the outer conduit 10 for accepting an atmospheric end seal 16. When the invention is assembled, atmospheric end seal 16 sealingly engages with mating surface 22 on flange 21. Formed on the inner surface of outer conduit 10 are the outer bearing races 15, 15'. These races are complementary to inner bearing races 15a, 15a. Formed through the outer conduit 10 and integral with the outer bearing races 15, 15' are the openings 23, 23'. When the outer conduit 10 is fitted over the inner conduit 11, the outer bearing races 15, 15' and the inner bearing races 15a, 15a' are operatively disposed so as to form hollow toroidal passageways for receiving ball bearings 14. The openings 23, 23' are then sealed off to contain the ball bearings 14, which have been packed with grease, with the set screws 13 and locking nuts 12. Conventional zerts could be used if desired.

As also shown in FIG. 2, the inner surface of outer conduit 10 is formed of a shape complementary to the circumferencial characteristics of inner conduit 11. Thus, when inner conduit 11 is inserted into outer conduit 10 a snug fit is obtained.

Both inner conduit 11 and outer conduit 10 are provided with a neck-down feature 24, 24' which enables the swivel to be put into service without the use of adapters or other coupling collars.

One of the unique features of Applicant's invention is the orientation of the seals, wear pads, and ball bearing assemblies. The placement of wear pads 17, 19 encourages the maintenance of proper alignment of the outer surface of inner conduit 11 to the inner surface of outer conduit 10. The placement of wear pad 19 between the ball bearing races and wear pad 17 at the forward end of inner conduit 11 makes it possible for wear pads 17, 19 to act as secondary load bearing components should significant wear be incurred in the bearing races. In such a case, the ball race and bearing assemblies then become a safety mechanism preventing separation of inner conduit 11 from outer conduit 10.

Similarly, the location of primary seal O-rings 18, 18' forward of wear pad 19 and the bearing races, but behind wear pad 17, works to lessen the amount of wear imparted to these seals by the swiveling of the joint. The presence of wear pad 19 also lessens the wear on inner atmospheric seal 20.

Inner atmospheric seal 20, when coupled with the use of atmospheric end seal 16 provides a high performance barrier against leakage, especially useful in submerged service. The atmospheric seals 16, 20 along with primary seal O-rings 18, 18' also function to isolate the bearing chambers and wear pad 19 from the contents moving through the swivel joint.

The invention as described is thus capable of moving fluid under high pressure for an extended period as compared to known devices. The invention, of course, is capable of being manipulated in 360° rotation owing to the use of ball bearing assemblies and the complementary construction of the outer surface of inner conduit 11 and the inner surface of outer conduit 10. Even after its bearing races have experienced wear, the swivel joint of the present invention may remain functional because of wear pads 17, 19. The potential for a catastrophic failure is also reduced by the use of wear pads, 17, 19, as the load will be transferred to the wear pads in a fashion as to save the bearing races from such a degree of wear that a separation of inner conduit 11 from outer conduit 10 might occur. Flange 21 provides additional protection against catastrophic failure of the swivel joint as the receiving end 33 of outer conduit 10 will bind against the inner surface 22 of flange 21 should the joint become unstable.

Figure 1:
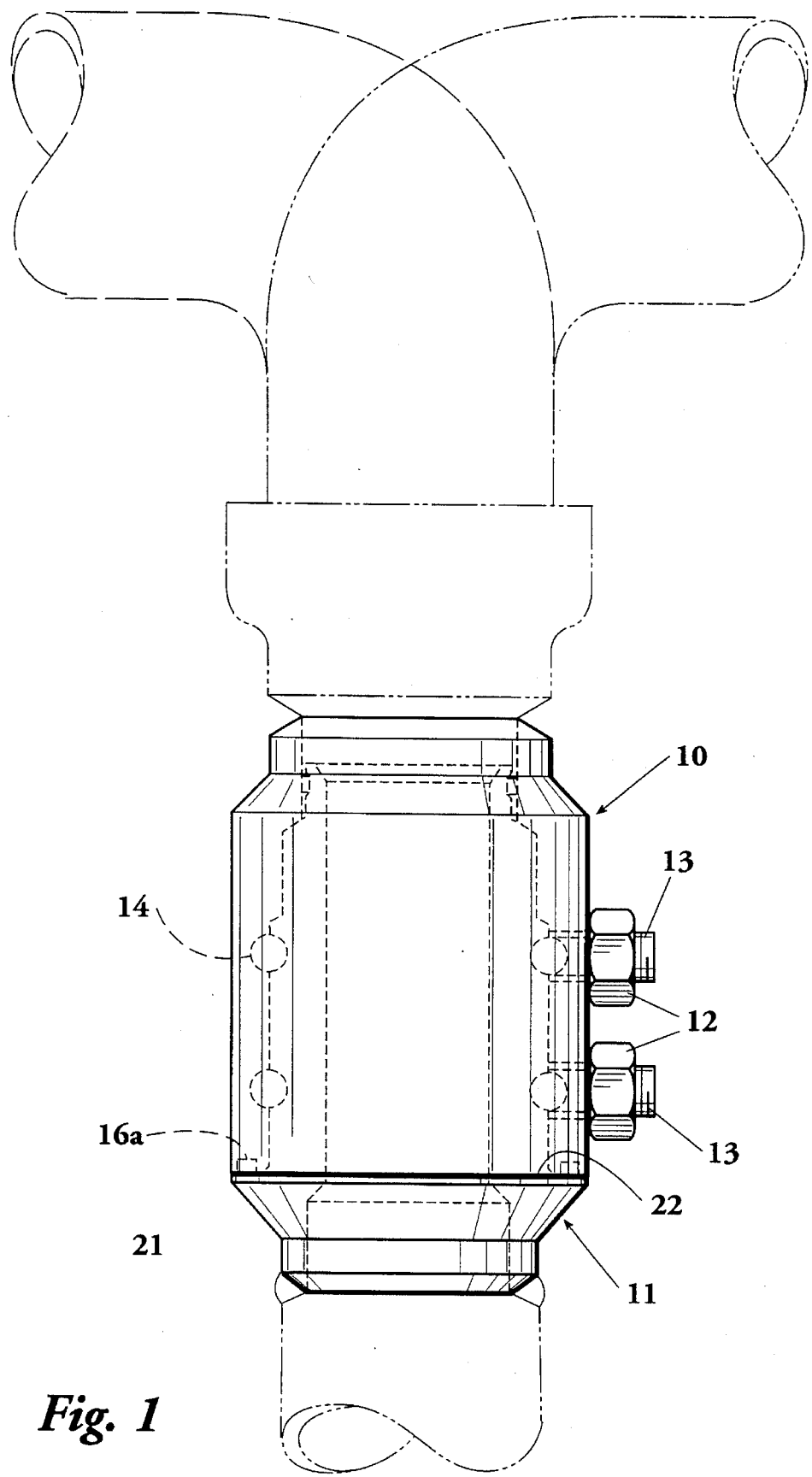
FIG. 1 is a cross-sectional view of the assembled swivel joint attached at one end to an elbow joint.

FIG. 1 shows the assembled swivel joint in service. Shown is the outer conduit 10 fitted over the inner conduit 11. The set screws 13 and locking nuts 12 are in place. Also shown are the ball bearings 14 and the atmospheric end seal recessed area 16a adjacent to the mating surface 22 of the flange 21.

Figure 3:
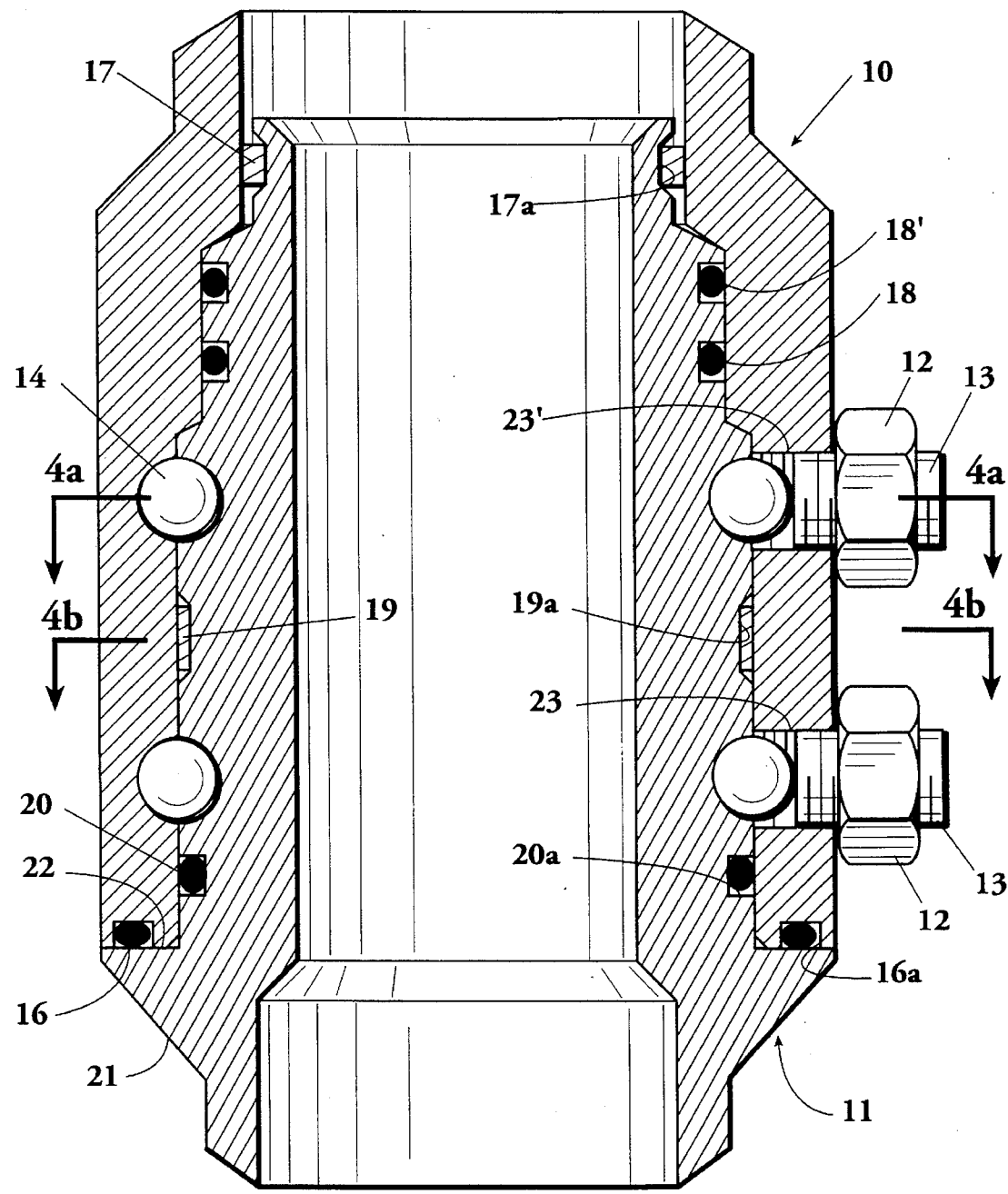
FIG. 3 is a detailed cross-sectional view of the assembled swivel joint.

FIG. 3 shows a detailed cross-sectional view of the assembled swivel joint. Shown is the outer conduit 10 fitted over the inner conduit 11. The primary seal O-rings 18, 18' are visible and are shown seated in the primary seal O-ring recessed areas 18a, 18a'. The ball bearings 14 are shown in the toroidal passageway formed by the outer bearing races and the complementary inner bearing races. The internal atmospheric seal 20 is shown in the internal atmospheric seal recessed area 20a, as is the atmospheric end seal 16 shown in the atmospheric end seal recessed area 16a. The openings 23, 23' through the outer conduit 10 for receiving ball bearings 14 are shown plugged off with the set screws 13 and the locking nuts 12. Also shown is the flange 21 and mating surface 22 which sealingly engages the atmospheric end seal 16. Also visible are the large and small wear pads 19 and 17 located in the large and small wear pad recessed areas 19a and 17a, respectively.

Figure 4A:
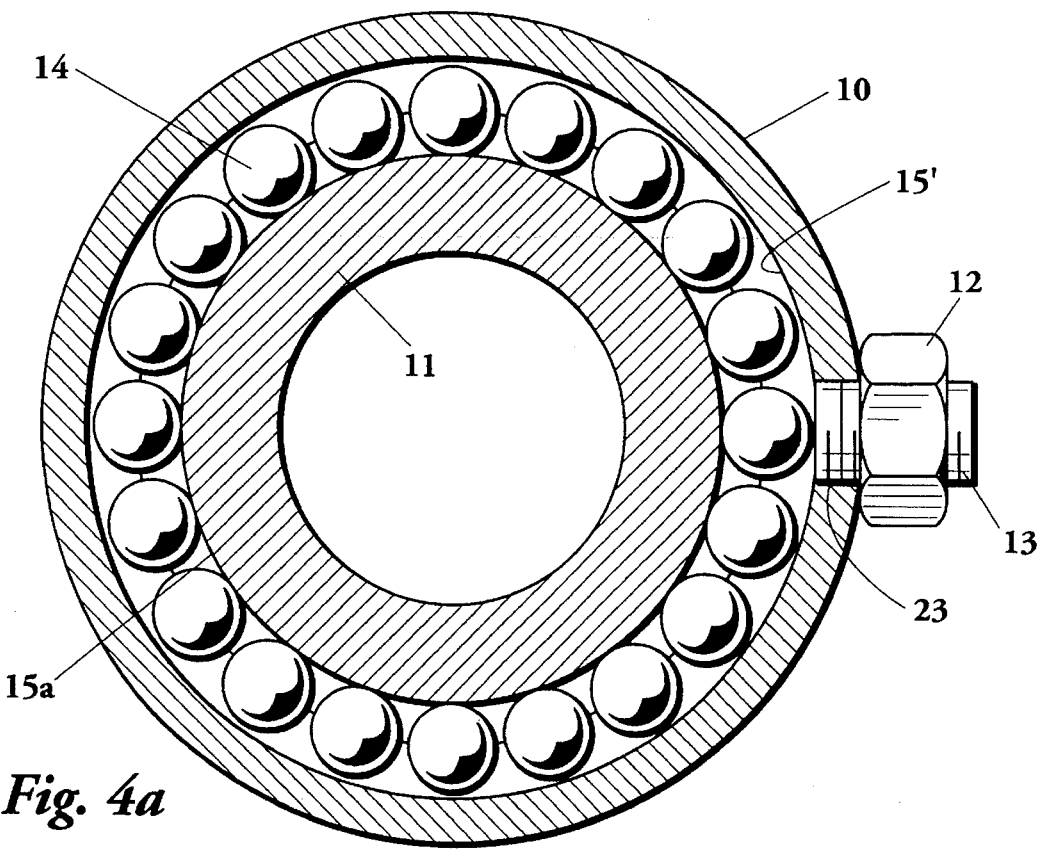
FIG. 4a is a cross-sectional view taken along line 4a—4a of FIG. 3.
Figure 4B:
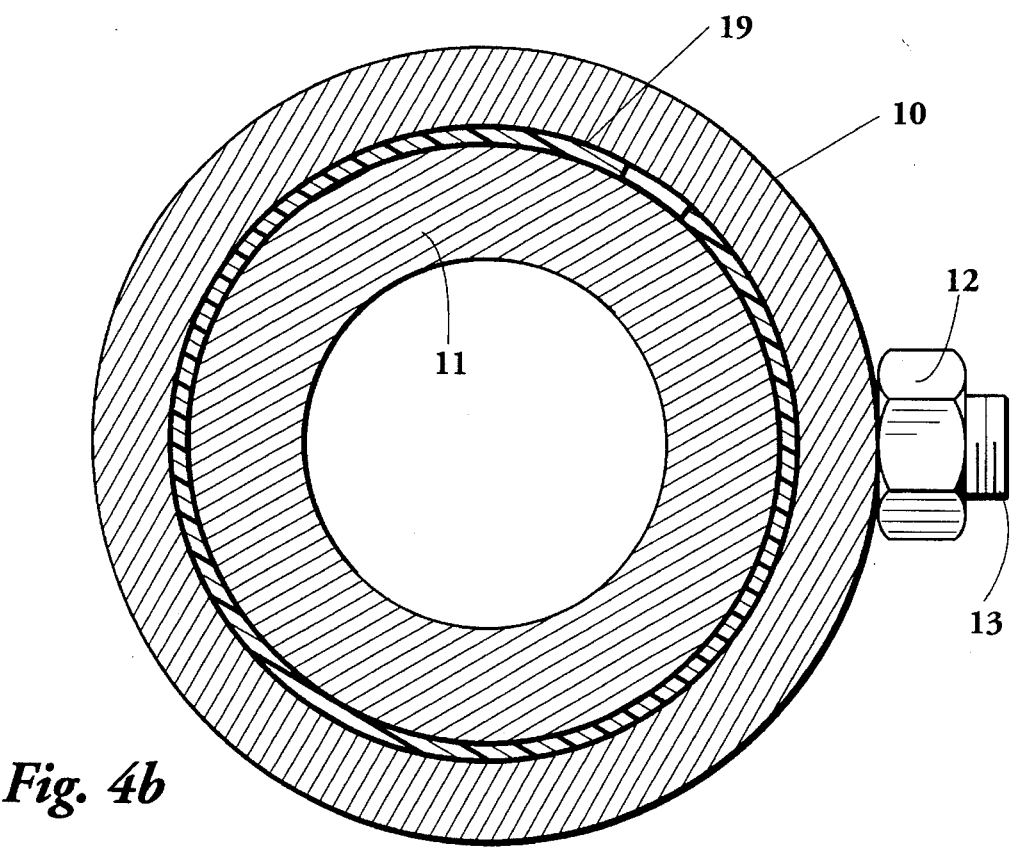
FIG. 4b is a cross-sectional view taken along line 4b—4b of FIG. 3.

FIG. 4a shows a cross-sectional view taken along line 4a—4a of FIG. 3. Shown is the outer conduit 10, and the inner conduit 11. The ball bearings 14 are visible resting in the toroidal passageway formed by the outer bearing race 15' and the inner bearing race 15a'. Shown through the outer conduit 10 is the opening 23 being plugged with the set screw 13 and secured with locking nut 12. FIG. 4b shows a cross-sectional view along line 4b—4b of FIG. 3. Shown is the outer conduit 10, the inner conduit 11, the set screw 13, the locking nut 12, and the large wear pad 19.

In operation a first section of pipe sought to be joined to the swivel joint would be connected to the base region of inner conduit 11. In one embodiment, the insertion area of inner conduit 11 is threaded so as to receive a complementary-sized, threaded pipe segment. A second pipe segment is then connected to the end of outer conduit 10 opposite of receiving end 33. Generally, the swivel joint will be assembled prior to the connection of pipe. However, if it is desirable, the pipe segments may be first connected to their respective conduits before the assembly of the swivel joint.

The assembly of the swivel joint, of course, first includes the placing of seals 16, 18, 18', 20 in their respective recessed areas 16a, 18a, 18a', 20a. Wear pads 17, 19 are also positioned within their respective recessed areas 17a, 19a. Inner conduit 11 is inserted through receiving end 33 of outer conduit 10 such that atmospheric end seal 16 abuts mating surface 22 of flange 21 of inner conduit 11. At this point, bearing races 15a, 15a' on the outer surface of inner conduit 11 are in complementary relation to bearing races 15, 15' located on the inner surface of inner conduit 10. Ball bearings 14 are inserted through opening 23 of outer conduit 10 to fill the toroidal passageway. After ball bearings 14 are inserted, along with an appropriate lubricant such as grease, openings 23, 23' are plugged with set screws 13 and locking nuts 12.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An improved swivel joint, comprising:
   a. a tubular, inner male conduit;
   b. a tubular, outer female conduit;
   c. means for mating said conduits in a rotatable relation said conduits having opposing ends;
   d. means for sealing the space between said conduits to protect against leakage; and
   e. at least one wear pad interposed circumferentially in a recessed area between said conduits such that, should a portion of the opposed surfaces of said conduits experience wear, said wear pad will preserve the integrity of said swivel joint by bearing load forces and maintaining a proper alignment of said conduits.

2. An improved swivel joint according to claim 1 wherein said means for mating said conduits comprises two ball race and bearing assemblies interposed between said conduits and wherein at least one said wear pad is positioned intermediate to said ball race and bearing assemblies.

3. An improved swivel joint according to claim 2 wherein said ball races are hardened and polished.

4. An improved swivel joint according to claim 1 wherein said male conduit includes a circumferential flange to abut said female conduit to provide a sealing surface and to provide a surface to which said female conduit will bind should the joint become unstable.

5. An improved swivel joint according to claim 4 wherein said means for sealing includes (1) an atmospheric end seal situated in a recessed area on said female conduit such that said end seal mates with said flange and (2) an internal end seal situated slightly forward of said flange in a recessed area on the outer surface of said male conduit.

6. An improved swivel joint according to claim 1 wherein said at least one wear pad is are made from a phenolic material.

7. An improved swivel joint according to claim 1 wherein the opposing ends of said joint are tapered.

8. An improved swivel joint, comprising:
   a. a tubular, male conduit having a circumferential flange opposite a forward end;
   b. a tubular, female conduit having a receiving end to abut said flange;
   c. two ball race and bearing assemblies interposed between said conduits for mating said conduits in a rotatable relation; said conduits having opposing ends
   d. a wear pad interposed circumferentially in a recessed area between said conduits and positioned intermediate to said ball race and bearing assemblies such that, should a portion of the opposed surfaces of said conduits experience wear, said wear pad will preserve the integrity of said swivel joint by bearing load forces and maintaining a proper alignment of said conduits;
   e. an atmospheric end seal situated in a recessed area on said female conduit such that said end seal sealingly engages said flange and an internal end seal situated slightly forward of said flange in a recessed area on the outer surface of said male conduit for sealingly engaging an area of the inner surface of said female conduit; and
   f. two primary seal O-rings situated forward of said ball race and bearing assemblies in recessed areas on the outer surface of said male conduit for sealingly engaging an area of the inner surface of said female conduit.

9. An improved swivel joint according to claim 8 wherein said ball races and recessed areas are hardened and polished.

10. An improved swivel joint according to claim 8 wherein said wear pad is made from a phenolic material.

11. An improved swivel joint according to claim 8 wherein the opposing ends of said joint are tapered.

12. An improved swivel joint, comprising:
   a. a tubular, male conduit, said male conduit having:
      a base region including a circumferential flange; and
      a nose forward of said base region;
   b. a tubular, female conduit having a receiving end;
   c. two ball race and bearing assemblies interposed between said conduits for mating said conduits in a rotatable relation; and
   d. a plurality of seals and wear pads interposed circumferentially between said conduits in the following fashion:

an atmospheric end seal situated in a recessed area on said receiving end of said female conduit such that said end seal sealingly engages said flange;

an internal end seal situated forward of said flange in a recessed area on the outer surface of said male conduit for sealingly engaging an area of the inner surface of said female conduit;

a first wear pad positioned forward of said internal end seal and intermediate to said ball race and bearing assemblies in a recessed area on the outer surface of said male conduit;

two primary seal O-rings situated forward of said ball race and bearing assemblies in recessed areas on the outer surface of said male conduit for sealingly engaging an area of the inner surface of said female conduit; and a second wear pad positioned forward of said O-rings and adjacent to said nose of said male conduit in a recessed area on the outer surface of said male conduit, such that, should a portion of the opposed surfaces of said conduits experience wear, said first and second wear pads will preserve the integrity of said swivel joint by bearing load forces and maintaining a proper alignment of said conduits.

* * * * *